(12) United States Patent
Johanning

(10) Patent No.: US 6,670,797 B2
(45) Date of Patent: Dec. 30, 2003

(54) METHOD AND DEVICE FOR CONTROLLING A DC-DC CONVERTER

(75) Inventor: Hans-Peter Johanning, Steinbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/242,841

(22) Filed: Sep. 13, 2002

(65) Prior Publication Data

US 2003/0026117 A1 Feb. 6, 2003

Related U.S. Application Data

(63) Continuation of application No. PCT/EP01/02476, filed on Mar. 5, 2001.

(30) Foreign Application Priority Data

Mar. 17, 2000 (EP) ............................................. 00105745

(51) Int. Cl.[7] ................................................. G05F 1/40
(52) U.S. Cl. ........................................ 323/282; 323/284
(58) Field of Search ................................. 323/282, 283, 323/284, 285, 351

(56) References Cited

U.S. PATENT DOCUMENTS

| | | | |
|---|---|---|---|
| 4,475,150 A | 10/1984 | D'Atre et al. ................. 363/51 |
| 5,912,552 A * | 6/1999 | Tateishi ....................... 323/285 |
| 5,982,161 A | 11/1999 | Nguyen et al. .............. 323/284 |
| 6,307,356 B1 * | 10/2001 | Dwelley ....................... 323/282 |
| 6,414,469 B1 * | 7/2002 | Zhou et al. .................. 323/272 |
| 6,445,600 B2 * | 9/2002 | Ben-Yaakov ................... 363/39 |
| 6,509,712 B1 * | 1/2003 | Landis ......................... 320/101 |

FOREIGN PATENT DOCUMENTS

| | | | |
|---|---|---|---|
| DE | 40 09 483 C1 | 10/1991 | ............ H02H/7/08 |
| DE | 43 10 240 A1 | 10/1993 | ........... B60R/16/04 |
| DE | 195 03 180 A1 | 8/1995 | .......... H02H/7/122 |
| EP | 0 744 818 A1 | 11/1996 | .......... H02M/3/335 |

* cited by examiner

*Primary Examiner*—Adolf D. Berhane
(74) *Attorney, Agent, or Firm*—Baker Botts L.L.P.

(57) ABSTRACT

In order to control a converter (1) which is used to convert a primary input voltage ($U_E$) into a secondary output voltage ($U_a$), a voltage value ($U_v$) derived from a secondarily detected real voltage ($U_{ist}$) is compared with a reference value ($U_R$), and a control signal ($S_a$) is produced as a criterion which triggers the disconnection of said converter (1) if said reference value is exceeded. The voltage value ($U_v$) or the reference value ($U_R$) is manipulated during a monitoring phase in such a way that said parameter is met.

17 Claims, 2 Drawing Sheets

METHOD AND DEVICE FOR CONTROLLING A DC-DC CONVERTER

CROSS REFERENCE TO RELATED APPLICATION

This application is a continuation of copending International Application No. PCT/EP01/02476 filed Mar. 5, 2001, which designates the United States.

BACKGROUND OF THE INVENTION

The invention pertains to a method for controlling a converter that converts the primary input voltage to a secondary output voltage. It also concerns a device for execution of the method. Converter here is understood to mean, in particular, a dc/dc converter.

This type of converter is frequently used in a so-called multivoltage network, in order to convert the primary input voltage referred to the converter to a comparatively high or low secondary output voltage. This type of multivoltage system is therefore commonly found in a vehicle as electrical power supply system, which, in addition to the low voltage loads generally set at a dc voltage of 12V, also operates with at least one heavy-duty load set, for example, at 42V. The system in the vehicle field comprises for this purpose a corresponding high-power generator and/or a corresponding heavy-duty battery, as well as a dc/dc converter that converts the dc voltage of, say, 42V to a 12V voltage of at least roughly the same power. The multivoltage network of a vehicle ordinarily also includes a low voltage battery, i.e., a 12V battery for example.

Regulation or control that adjusts the secondary output voltage of the converter in the direction toward a stipulated reference value is assigned to the common dc/dc converter within the electrical power supply system of a vehicle. A regulation or control intervention is required, in particular, when the output voltage drops as a result of power takeoff of a secondary load, especially below a stipulated threshold. When a low voltage battery is connected on the secondary side to the converter, this is engaged and the battery recharged if this is discharged below the threshold value because of the connected low voltage load. This type of electrical power supply system for a vehicle with activation or engagement of the dc/dc converter only when required is known from DE 43 10 240 A1.

This type of control of a converter with a battery connected on the secondary side can produce an uncontrolled state during malfunction. For example, a detonating gas mixture can form from chemical processes in the secondary battery if the output voltage to be set over a correspondingly long period on the secondary side surpasses a maximum value.

SUMMARY OF THE INVENTION

The underlying task of the invention is therefore to offer a method for controlling a converter in which malfunctions are reliably avoided by monitoring the regulated or controlled converter. In particular, the functional capability of monitoring itself is also to be monitorable. Moreover, a device particularly suitable for execution of the method is to be offered.

The task according to the invention is solved by a method for controlling a converter that converts a primary input voltage to a secondary output voltage, in which a voltage value derived from an actual voltage recorded on the secondary side is compared with a reference value and, on surpassing the reference value, a control signal is generated as tripping criterion for switching off the converter, in which, during a test phase, the voltage value or the reference value is manipulated so that the tripping criterion is met.

On the one hand, a threshold value monitoring occurs for this purpose by comparison of an actual voltage recorded on the secondary side with a reference voltage that essentially represents a stipulated maximum output voltage. On the other hand, threshold value monitoring itself is checked cyclically or at stipulated test intervals with respect to its functional capability, in which during the test phase either the reference value or a voltage value derived from the actual voltage recorded on the secondary side is reduced or increased so that the converter is switched off.

With such threshold value manipulation, the tripping criterion for switching off the converter is forced. On the one hand, the functional capability of threshold value monitoring can be checked by plausibility testing of the reaction of the converter to the tripping criterion, in which the actual state of the converter is queried. For this purpose the actual voltage recorded on the secondary side and/or an actual current recorded on the secondary side are used. If the recorded value satisfies the stipulated plausibility assertion, error-free function of threshold value monitoring is assumed and the test phase is terminated. Otherwise an error message occurs. In this manner, both the functional capability of the converter and the functional capability of the threshold value monitoring itself can be checked.

In order to ensure that the converter has a defined switching state during the test phase, i.e., especially during starting of the corresponding test program or test algorithm, in an advantageous modification, a test signal is initially generated to switch on the converter. The test signal can then be generated both as a function of the actual switching state of the converter and independently of it.

Since the actual voltages continuously compared in the context of threshold value monitoring are compared discretely in time to the reference value and a corresponding plausibility assertion is therefore also available during the test phase concerning falling short or surpassing of the reference value, it can be determined even at the beginning of the test phase with the corresponding plausibility query and with the test signal activated whether error-free testing of threshold value monitoring is possible. Threshold value monitoring has the actual voltage, preferably in the form of a voltage value derived from it by division, whereas the reference value expediently represents the maximum admissible output voltage.

In a particularly simple variant of the converter-control or regulation, the output voltage is set by a voltage regulator that generates a manipulated variable for the converter when the recorded actual voltage deviates from a stipulated reference voltage. In an advantageous embodiment, the voltage regulator, however, does not directly furnish the manipulated variable for the converter on the output side, but a reference current or current reference signal, which in turn drives a current control circuit subordinate to voltage regulation. This again compares the current reference signal generated by the voltage regulator with the actual current recorded on the secondary side and generates the corresponding manipulated variable for the converter during a deviation. Control of the converter therefore occurs in the manner of cascade control, which is characterized by particularly high control dynamics and control stability.

The task is solved according to the invention by a device for controlling a converter that converts a primary input voltage to a secondary output voltage, with a first regulator to set the output voltage, with a voltmeter to record the secondary actual voltage, with a switching device connected to a control input of converter for threshold value monitoring, which compares a voltage value derived from the actual voltage with a reference value and on surpassing reference value generates a control signal as tripping, criterion to switch off converter, and with a threshold value manipulator connected to switching device to raise the voltage value or lower the reference value so that the tripping criterion is met. Advantageous embodiments or objects of the dependent claims refer back to it.

The device contains, in addition to a first regulator or voltage regulator for adjustment of the output voltage, on the one hand, a safety or switching device connected to the converter on the output side for threshold value monitoring. This generates a control signal to switch off the converter if the actual voltage recorded on the secondary side by a voltmeter surpasses a reference value. On the other hand, the device contains the threshold value manipulator that is connected on the output side to an input of the switching device. The threshold value manipulator raises or lowers the voltage value during the cyclically initiated test phase. The gauge or measure of the threshold value change determined by calculation is then dimensioned so that the tripping criterion is met.

The gauge of threshold value manipulation is then advantageously determined from parameters already available in the context of regulation or control of the converter. The voltage value or reference value is then expediently multiplied by a factor that is determined in turn by quotient formation of the voltage value and reference value. The manipulated threshold value fed to the switching device on the input side is expediently corrected by a tolerance value to compensate for the measurement and/or calculation tolerance.

To generate the test signal, which is supposed to ensure, in particular, switching on of the converter during a test phase and before initiation of threshold value manipulation, a control module is provided that can be implemented in terms of hardware and software in a controller that also control the converter. The control module has a first control input for the actual voltage recorded on the secondary side and a second control input for the actual current recorded on the secondary side. The control output is connected to a switch or programmed switching element that switches the test signal appearing at a signal output of the control module to a control input of the converter.

The control module expediently serves both for starting and ending the test phase. For this purpose, an algorithm is entered in the control module that generates the test signal at the start of the test phase, on the one hand, and switches this to the converter and activates threshold value manipulation, on the other hand. To terminate the test phase, the threshold value manipulation, on the one hand, is stopped by means of the algorithm entered in the control module or representing it and the test signal switched off. With switching off of the test signal, the manipulated variable generated by the first or second controller is switched to the converter. Switching off of the threshold value manipulation occurs by sending the unaltered voltage value or reference value to the switching device connected on the output side to the switching input of the converter for threshold value monitoring.

The advantages achieved with the invention consist, in particular, of the fact that, on the one hand, by threshold value monitoring of a control or regulator converter undesired states as a result of malfunctions in the form of an excess voltage value are reliably avoided. On the other hand, by a test phase cyclically initiated or initiated at stipulated time intervals, threshold monitoring itself can be checked with respect to functional capabilities so that "sleeping errors" can also be reliably recognized. This guarantees that the threshold value monitoring, which represents a safety device for the control of the converter and the converter itself, reliably switches it off when necessary.

The method and device are particularly suited for controlling a dc/dc converter. However, they are also similarly suitable in conjunction with an ac-dc converter, a dc-ac converter or an ac-ac converter. The direction of power transmission can then be different, in which primary side is understood to mean the side of the corresponding converter at which power supply occurs, while the secondary side is then the side of the converter at which the power is transferred.

BRIEF DESCRIPTION OF THE DRAWINGS

Practical examples of the invention are further explained below with reference to a drawing. In the drawing.

Parts that correspond to each other in the two figures are provided with the same reference numbers.

DETAILED DESCRIPTION OF THE PREFERRED EMBODIMENTS

Figure 1:
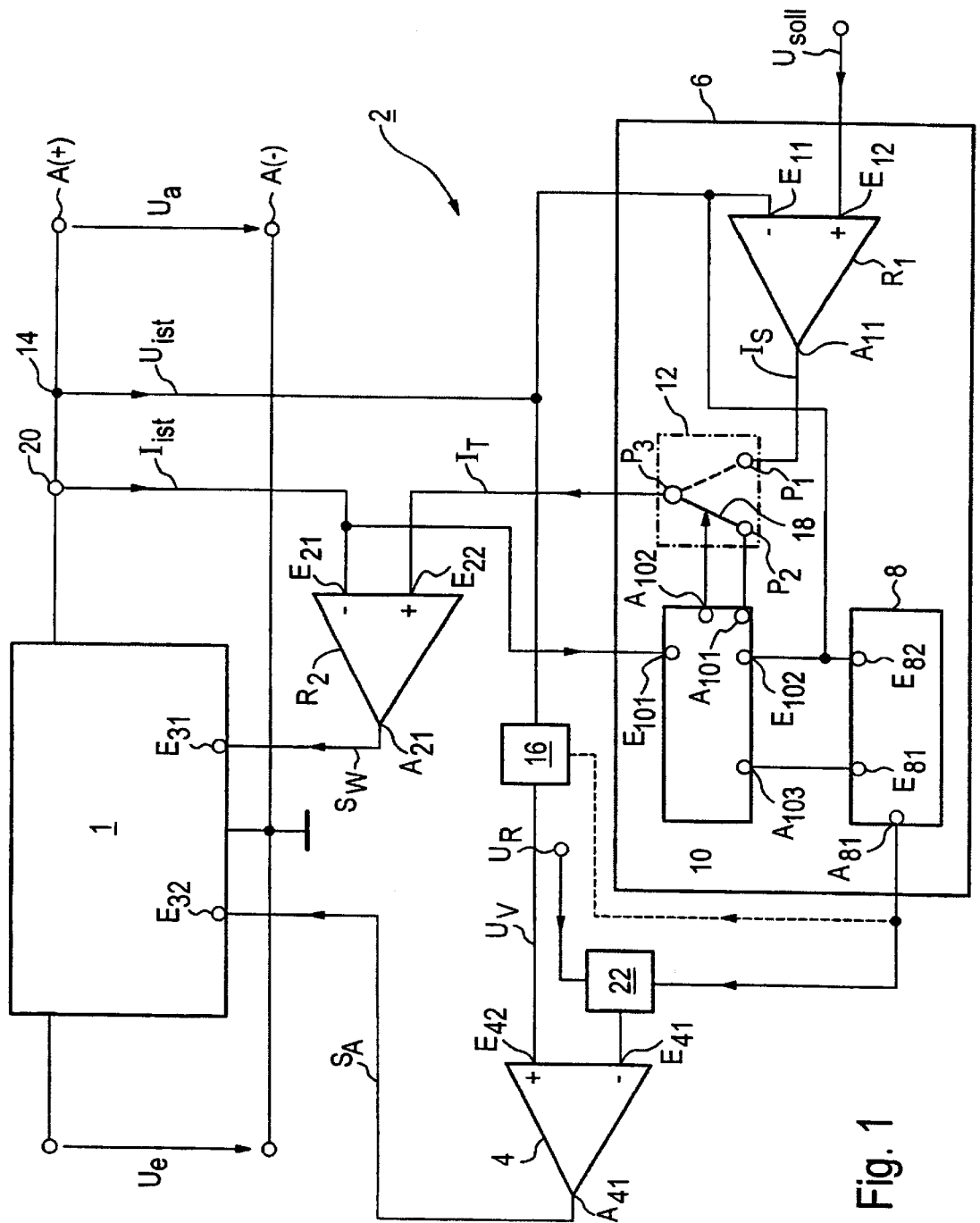
FIG. 1 is schematically depicts a safety device for controlling a dc/dc converter and FIG. 2 shows a flow chart for testing the functional reliability of the safety device.

FIG. 1 shows a dc/dc converter 1 that converts an input voltage $U_i$ to an output voltage $U_o$. The input voltage $U_i$ is a voltage of, say, 42V generated in a manner not further shown in an electrical multivoltage network of a vehicle by a generator or heavy-duty battery. A so-called starter generator can also be incorporated on the generator side in the voltage system of the vehicle.

The output voltage $U_o$ generated on the secondary side from secondary input voltage $U_i$ by conversion at least roughly identical power referred to the dc/dc converter 1 subsequently referred to as converter is a comparatively low dc voltage in this application within an electrical power supply system of the vehicle, which corresponds, for example, to a 12V battery voltage of a low voltage battery. In this application an output terminal A(+) of converter 1 can be connected to a plus pole and an output terminal A(−) connected to ground can be connected to a minus pole of the low voltage battery supplied from the secondary output voltage $U_o$.

A control device 2 is connected to converter 1 that includes a first regulator or voltage regulator $R_1$ and a second regulator or current regulator $R_2$, as well as a threshold monitoring 4 designed here as a comparator and a controller 6 preferably in the form of a microprocessor. Controller 6 contains threshold value manipulator 8 and a control module 10 connected to it, as well as switching element 12. Voltage regulator $R_1$ in the practical example is part of controller 6.

A voltmeter 14 connected to the control device 2 records the actual voltage $U_{act}$ generated by converter 1 on the secondary side. On the one hand, this is fed both to a regulator input $E_{11}$ and to threshold value manipulator 8 and control module 10, and, on the other hand, to a signal input $E_{42}$ of threshold value monitoring 4 via a divider and switching element 16. Voltage regulator $R_1$ is supplied a reference voltage $U_{ref}$ via a second regulator input $E_{12}$. A control output $A_{11}$ of voltage regulator $R_1$ is fed to a first switch terminal $P_1$ and switching element 12. A second switch terminal $P_2$ of switching element 12 is connected to signal output $A_{101}$ and control module 10. A switching or control output $A_{102}$ of control module 10 acts on switching element 18 of switch 12 to connect its third switch terminal $P_3$ to switch terminal $P_1$ or $P_2$. Switch terminal $P_3$ is connected to regulator input $E_{22}$ of current regulator $R_2$, whose other control input $E_{21}$ is connected to ammeter 20 to record the actual current $I_{act}$ of converter 1 on the secondary side. Regulator output $A_{21}$ of current regulator $R_2$ is connected to control input $E_{31}$ of converter 1.

The actual current $I_{act}$ is also fed to a signal input $E_{101}$ of control module 10. The actual voltage $U_{act}$ is fed to control module 10 by a signal input $E_{102}$. A control output $A_{103}$ of control module 10 is connected to control input $E_{31}$ of threshold value manipulator 8, at whose signal input $E_{52}$ to the actual voltage $U_{act}$ is fed. A control output $A_{81}$ of threshold value manipulator 8 is fed to the divider and switching element 16 or to a corresponding divider or switching element 22 to which a reference value $U_R$ representing a maximum voltage $U_{max}$ is fed. The divider and switching element 22 is connected in turn to a signal input E41 of threshold value monitoring 4. Its control output A41 is connected to a switching or control input $E_{32}$ of converter 1.

When converter 1 is engaged, the voltage regulator $R_1$ of control device 2 serves to regulate the output voltage $U_o$. For this purpose, voltage regulator $R_1$ brings the actual voltage $U_{act}$ recorded on the secondary side to the stipulated reference value $U_{ref}$. The control output $A_1$ of voltage regulator $R_2$ is then connected via switching element 12 to the regulator input $E_{22}$ of current regulator $R_2$. This again brings the actual current $I_{act}$ recorded on the secondary side to a reference current representing a current reference value signal $I_c$ generated by the voltage regulator $R_1$ and generates a manipulated variable $S_c$ for the converter 1. Control of controller 1 therefore does not occur directly via the high level voltage control circuit, but indirectly via the lower level current regulation circuit. Because of this, particularly high control dynamics and control stability of a cascade control formed by voltage regulator $R_1$ and current regulator $R_2$ are achieved.

Regardless of the switching state of converter 1, threshold value monitoring represented by the comparator 4 monitors the actual voltage $U_{act}$ with respect to surpassing of the reference value $U_R$. The actual voltage $U_{act}$ is then divided expediently by the divider element 16 by a factor c, in which $0 < c \leq 1$. Threshold value monitoring 4 is therefore fed a voltage value $U_V$ with $U_V = c$ via its signal input $E_{42}$. The reference value $U_R$ corresponds to a maximum admissible output voltage $U_0$ with $U_0 = U_{max} = U_R$. Threshold value monitoring 4 compares the voltage value $U_v$ with the reference value $U_R$ and, on surpassing reference value $U_R$, generates an output signal $S_A$ as tripping criterion for switching off converter 1, which is supplied this via a signal input $E_{41}$. The tripping criterion, for example, is fulfilled when the secondary output voltage $U_0$ meets the condition:

$U_o = U_{act} \geq U_{max}$, in which $U_{max}$, for example, is 16V.

Figure 2:
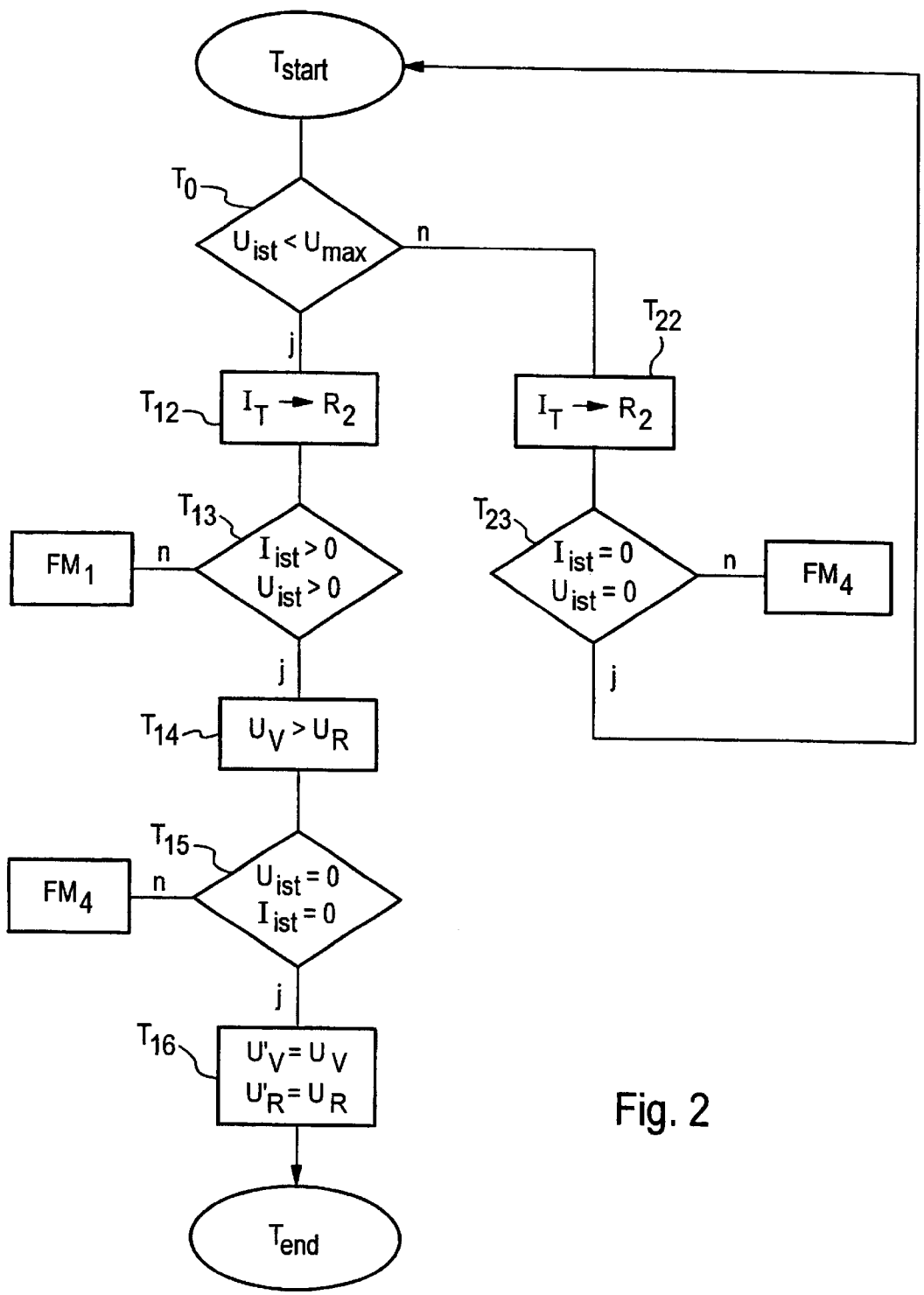

In order to be able to recognize a "sleeping error" within the control device 2 and especially within threshold value monitoring 4, a test phase in the form of a test program T preferably implemented by means of software is cyclically run or during or before each engagement of converter 1, whose individual program steps (beginning with a program start $T_{start}$) are shown in the flow chart, particularly in FIG. 2.

After the program start $T_{start}$, the control module 10 compares in a first program step $T_0$ the actual voltage $I_{act}$ fed to it via a signal input $E_{102}$ with the maximum admissible voltage $U_{max}$ also entered in control module 10. If the actual voltage $U_{act}$ is smaller than the admissible maximum voltage $U_{max}$, the test program goes to a program step $T_{12}$, otherwise to a program step $T_{22}$. In both program steps $T_{12}$ and $T_{22}$, the switching element 18 of switch 12 is switched by means of switching module 10 to the switch terminal $P_2$ connected to the signal output $A_{101}$ and a test signal $I_t$ generated by switching module 10 is fed to the regulator input $E_{22}$ of current regulator $R_2$. The test signal $I_t$ represents a current reference value signal or a reference current that causes the current regulator $R_2$ to engage to converter 1. The test signal $I_t$ is also generated when converter 1 is already engaged.

In a program step $T_{23}$ connected to program step $T_{22}$, control module 10 of controller 6 compares the recorded actual current $I_{act}$ and/or the recorded actual voltage $U_{act}$ with the plausibility criterion that is zero in the practical example. If the criterion $I_{act} = 0$, when the converter 1 is connected on the secondary side to a battery or to a load, or the criterion $U_{act} = 0$, when converter 1 is not connected on the secondary side to a battery or to a load, is not met, an error message $FM_4$ occurs. This indicates a defect of the safety device represented by the threshold value monitoring 4. Otherwise, i.e., when this plausibility criterion is met, no more detailed assertion is possible, so that this program path of the test program T goes back to the program start $T_{start}$. Error-free function of the safety device is then assumed, since at $U_{act} \geq U_{max}$ the converter 1 either does not operate or is defective.

In the parallel program path, the control module 10 of controller 6 compares in a program step $T_{13}$ that follows program step $T_{12}$, the actual voltage $U_{act}$ recorded on the secondary side and/or the actual current $I_{act}$ recorded on the secondary side with an additional plausibility criterion. This corresponds, as shown in the flow chart according to FIG. 2, to the same plausibility criterion, but according to a different relation. If $I_{act} > 0$ when a battery or load is connected on the secondary side to converter, or $U_{act} > 0$ when no battery or no load is connected, the test program T goes to a program step $T_{14}$. Otherwise, an error message $FM_2$ is generated, which indicates a defect of converter 1.

If the plausibility criterion checked in program step $T_{13}$ is fulfilled, threshold value manipulation occurs in program step $T_{14}$. For this purpose, threshold value manipulator 8 is activated by control module 10. This sends via its control output $A_{51}$ either a raised voltage value $U'_v$ with $U'_v > U_v$ to the signal input $E_{42}$ of the comparator 4 or a reduced reference value $U'_R$ with $U'_R < U_R$ to the signal input $E_{41}$ of comparator 4. Threshold value manipulation with raising of the voltage value $U_v$ occurs expediently according to the relation $$U'_v = U_v \cdot \frac{}{U_{in}} + \Delta x$$

in which $\Delta x$ is a stipulated tolerance value. Similarly, threshold value manipulation by reduction of the reference value $U_R$ expediently occurs according to the relation:

$$U'_R = U_R \cdot \frac{}{U_{max}} - \Delta x$$

With this program step, forced switching off of converter 1 occurs, since the tripping criterion for switching off converter 1 is met by threshold value manipulation.

After an adjustable waiting time t, program T goes to a program step $T_{15}$ in which a plausibility query again occurs. Waiting time t is expediently set so that the switch-off signal $S_a$ on the output side is a result of threshold value manipulation of comparator 4 is that the control input $E_{32}$ of converter 1 and this is considered switched off.

In program step $T_{15}$, the plausibility query whether the actual voltage $U_{act}$ fulfills the criterion $U_{act} = 0$ and/or whether the actual current $I_{act}$ fulfills the criterion $I_{act} = 0$ again occurs. If this plausibility criterion is fulfilled, the converter 1 is switched off as a result of the tripping criterion necessarily generated by threshold value manipulation and the program goes to a program step $T_{15}$. Otherwise an error message $FM_4$ occurs, indicating a defect of threshold value monitoring 4 and therefore of the safety device.

In program step $T_{16}$, the control module 10 of controller 6, on the one hand, switches off threshold value manipulation 8 and, on the other hand, switches the switching element 18 of switch 12 from switch terminal $P_2$ to the switch terminal $P_1$. Because of this the cascade control represented by voltage regulator $R_1$ and current regulator $R_2$ and therefore control of converter 1 are activated. Switching off of threshold value manipulator 8 occurs through its control by control module 10 so that the threshold value manipulator 8 sets the signal input $E_{42}$ of comparator 4 at the voltage value $U_v$ or the signal input $E_{41}$ at the reference value $U_R$. The test program T is then ended by a corresponding program order $T_{end}$.

The test program T therefore carries out testing of the functional capability of threshold value monitoring 4, in which errors within the control device 2 in terms of hardware or software are recognized. The test program T also permits detailed error recognition of the power supply system formed from the converter 1 and the control device 2 in which a distinction is at least made between a defective converter 1 and a defective threshold value monitoring 4 and therefore a defective safety device 2.

These error messages $FM_{1,4}$ can also be used for additional switching functions according to which, for example, during occurrence of an error message $FM_4$ indicating a defect of threshold value monitoring 4, the converter 1 is necessarily switched off or held in an engaged state for an adjustable maximum period. The error messages $FM_{1,4}$ can also be displayed as warning signals or used as a control criterion for a higher level regulation or control.

What is claimed is:

1. Method for controlling a converter that converts a primary input voltage to a secondary output voltage, wherein a voltage value derived from an actual voltage recorded on the secondary side is compared with a reference value and, on surpassing the reference value, a control signal is generated as tripping criterion for switching off the converter, in which, during a test phase, the voltage value or the reference value is manipulated so that the tripping criterion is met.

2. Method according to claim 1, wherein the actual voltage recorded on the secondary side and/or an actual current recorded on the secondary side is used for testing of the switching state assumed by the converter as a result of the tripping criterion.

3. Method according to claim 1, in which the manipulation of voltage value or reference value is ended when the converter is switched off as a result of the tripping criterion.

4. Method according to claim 1, wherein a test signal is generated to engage the converter, in which the actual voltage recorded on the secondary side and/or an actual current recorded on the secondary side are used to test the switching state assumed by the converter as a result of test signal.

5. Method according to claim 1, wherein an error message is generated when the converter assumes a nonplausible switching state during the test phase.

6. Method according to claim 1, wherein the output voltage is set by a voltage regulator in which a manipulated variable is determined for converter from a deviation of the recorded actual voltage from a stipulated reference voltage.

7. Method according to claim 6, wherein the manipulated variable is determined from the deviation of an actual current recorded on the secondary side from a reference current generated by the voltage regulation.

8. Device for controlling a converter that converts a primary input voltage to a secondary output voltage, comprising:

a first regulator to set the output voltage, a voltage detector for detecting the secondary actual voltage, a switching device connected to a control input of converter for threshold value monitoring, which compares a voltage value derived from the actual voltage with a reference value and on surpassing reference value generates a control signal as tripping criterion to switch off converter, and a threshold value manipulator connected to switching device to raise the voltage value or lower the reference value so that the tripping criterion is met.

9. Device according to claim 8, further comprising a second regulator with a first regulator input and a second regulator input to adjust the secondary output current, in which the first regulator input is connected with a current detector for detecting the secondary actual current and a control output of the first regulator can be switched to the second regulator input.

10. Device according to claim 8, further comprising a control module comprising a first control input for the actual voltage recorded on the secondary side and a second control input for an actual current recorded on the secondary side, as well as a signal output and a control output that is connected to a switching element to switch a test signal occurring at the signal output to a control input of converter.

11. Method for controlling a converter that converts a primary input voltage to a secondary output voltage, comprising the steps of:

comparing a voltage value derived from an actual voltage recorded on the secondary side with a reference value and, if the voltage value exceeds the reference value, then generating a control signal as tripping criterion for switching off the converter, and further, during a test phase, comprising the step of:

altering the voltage value or the reference value in such a way that the tripping criterion is met.

12. Method according to claim 11, wherein the actual voltage recorded on the secondary side and/or an actual current recorded on the secondary side is used for testing of the switching state assumed by the converter as a result of the tripping criterion.

13. Method according to claim 11, wherein the manipulation of voltage value or reference value is ended when the converter is switched off as a result of the tripping criterion.

14. Method according to claim 11, wherein a test signal is generated to engage the converter, in which the actual voltage recorded on the secondary side and/or an actual current recorded on the secondary side are used to test the switching state assumed by the converter as a result of test signal.

15. Method according to claim 11, wherein an error message is generated when the converter assumes a nonplausible switching state during the test phase.

16. Method according to claim 11, wherein the output voltage is set by a voltage regulator in which a manipulated variable is determined for converter from a deviation of the recorded actual voltage from a stipulated reference voltage.

17. Method according to claim 16, wherein the manipulated variable is determined from the deviation of an actual current recorded on the secondary side from a reference current generated by the voltage regulation.

* * * * *